(12) United States Patent
Badana et al.

(10) Patent No.: US 11,677,788 B1
(45) Date of Patent: Jun. 13, 2023

(54) POLICY-CONTROLLED WEB ACCESS BASED ON USER ACTIVITIES

(71) Applicant: Netskope, Inc., Santa Clara, CA (US)

(72) Inventors: Siva Prasad Badana, San Jose, CA (US); Naiming Chu, Los Altos, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/965,641

(22) Filed: Oct. 13, 2022

(51) Int. Cl.
*H04L 9/40* (2022.01)

(52) U.S. Cl.
CPC .......... *H04L 63/20* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | |
|---|---|---|
| 7,747,680 B2 | 6/2010 | Ravikumar et al. |
| 8,281,361 B1 * | 10/2012 | Schepis .............. H04N 21/2541 |
| | | 707/602 |
| 8,281,366 B1 | 10/2012 | McCorkendale et al. |
| 8,434,126 B1 * | 4/2013 | Schepis .............. H04N 21/6582 |
| | | 726/16 |
| 8,655,730 B1 | 2/2014 | Swan et al. |
| 9,330,274 B2 | 5/2016 | Schepis et al. |
| 9,560,053 B2 * | 1/2017 | Prisser .................. H04L 63/102 |
| 10,803,005 B2 | 10/2020 | Baldry et al. |
| 10,853,897 B2 | 12/2020 | Williams |
| 2005/0086105 A1 | 4/2005 | McFadden et al. |
| 2011/0185436 A1 | 7/2011 | Koulinitch et al. |
| 2011/0302498 A1 | 12/2011 | Gorodyansky |
| 2013/0017806 A1 * | 1/2013 | Sprigg .................... H04M 1/66 |
| | | 455/411 |
| 2013/0124317 A1 | 5/2013 | Ramer et al. |
| 2015/0032890 A1 * | 1/2015 | Bott ....................... H04W 12/37 |
| | | 709/224 |

(Continued)

FOREIGN PATENT DOCUMENTS

| | | |
|---|---|---|
| JP | 2007286832 A | 11/2007 |
| JP | 2012164323 A | 8/2012 |

(Continued)

*Primary Examiner* — Darren B Schwartz
*Assistant Examiner* — Hassan Saadoun
(74) *Attorney, Agent, or Firm* — Mughal IP P.C.

(57) ABSTRACT

A policy-controlled access system comprising a client device running a local application, a secure tunnel between a client endpoint of the client device, and a mid-link endpoint of a mid-link server to provide network traffic from the client device to the mid-link server. The mid-link server monitors the network traffic, identifies a plurality of policies corresponding to the third-party content, the plurality of policies is based on parental control configuration set by a parent user, stores the plurality of policies corresponding to the third-party content in a local cache on the client device, and receives a request for data from the child user. After the request is made, the local application correlates the third-party content with the plurality of policies stored in the local cache, identifies a policy associated with the request for the data based on correlation, and authorizes the request for the data based on the identified policy.

20 Claims, 11 Drawing Sheets

(56) References Cited

U.S. PATENT DOCUMENTS

| 2016/0267552 A1 | 9/2016 | Chandra |
| 2018/0048514 A1* | 2/2018 | Arunachalam ....... H04L 63/102 |
| 2021/0286889 A1 | 9/2021 | Day, II et al. |

FOREIGN PATENT DOCUMENTS

| JP | 2020129375 A | 8/2020 |
| WO | 2009008484 A1 | 1/2009 |
| WO | 2017128423 A1 | 8/2017 |

* cited by examiner

POLICY-CONTROLLED WEB ACCESS BASED ON USER ACTIVITIES

BACKGROUND

This disclosure relates in general to Internet access systems and, but not by way of limitation, to access control to third-party content based on user's browsing activities among other things.

Internet usage especially at home lacks visibility and is susceptible to threats. Lack of visibility pose a threat to the computer system and also affects user socially. Improper oversight of user's browsing activities can lead to undesired circumstances that parents guard against for their children.

The unrestricted access to the internet may be a security threat to a minor who may not have the ability to take the right decisions independently. Proper supervision of the user's online activities becomes essential to prevent them from being misled. Clear visibility and granular filtering of the user's web activities is critical to the safety of the user.

SUMMARY

In one embodiment, the present disclosure provides a policy-controlled access system comprising a client device running a local application, a secure tunnel between a client endpoint of the client device, and a mid-link endpoint of a mid-link server to provide network traffic from the client device to the mid-link server. The mid-link server monitors the network traffic, identifies a plurality of policies corresponding to the third-party content, the plurality of policies is based on parental control configuration set by a parent user, stores the plurality of policies corresponding to the third-party content in a local cache on the client device, and receives a request for data from the child user. After the request is made, the local application correlates the third-party content with the plurality of policies stored in the local cache, identifies a policy associated with the request for the data based on correlation, and authorizes the request for the data based on the identified policy.

In an embodiment, a policy-controlled access system for providing access to third-party content, the policy-controlled access system comprising a client device, and a mid-link server. The client device comprising a local application, run on the client device. A secure tunnel between a client endpoint of the client device and a mid-link endpoint of the mid-link server, the secure tunnel is configured to provide, network traffic from the client device to the mid-link server. The network traffic includes the third-party content accessed by a child user on the client device. The mid-link server monitors the network traffic from the client device, identifies a plurality of policies corresponding to the third-party content on the client device, the plurality of policies is based on parental control configuration set by a parent user on the client device, stores the plurality of policies corresponding to the third-party content in a local cache on the client device, and receives a request for data from the child user via the client device. The local application on the client device correlates the third-party content with the plurality of policies stored in the local cache, identifies a policy associated with the request for the data based on correlation, and authorizes the request for the data based on the identified policy.

In another embodiment, a method providing policy-controlled access on an internet connected network. In one step, a local application is run on a client device, a secure tunnel is provisioned between a client endpoint of the client device and a mid-link endpoint of a mid-link server. Network traffic is provided from the client device to the mid-link server. The network traffic includes third-party content accessed by a child user on the client device. The network traffic is monitored by the mid-link server from the client device. A plurality of policies corresponding to the third-party content on the client device is identified by the mid-link server. The plurality of policies is based on parental control configuration set by a parent user on the client device. The plurality of policies corresponding to the third-party content in a local cache on the client device is stored by the mid-link server. A request for data is received from the child user over the internet network. The third-party content is correlated by the local application on the client device with the plurality of policies stored in the local cache. A policy associated with the request for the data is identified by the local application based on correlation and the request for the data is authorized by the local application based on the identified policy.

In yet another embodiment, a policy-controlled access system for providing access to third-party content based on policies in internet network, the policy-controlled access system comprising a plurality of servers, collectively having code for:

running a local application on a client device;

provisioning a secure tunnel between a client endpoint of the client device and a mid-link endpoint of a mid-link server;

providing by the secure tunnel, network traffic from the client device to the mid-link server, wherein the network traffic includes third-party content accessed by a child user on the client device;

monitoring by the mid-link server, the network traffic from the client device;

identifying by the mid-link server, a plurality of policies corresponding to the third-party content on the client device, wherein the plurality of policies is based on parental control configuration set by a parent user on the client device;

storing by the mid-link server, the plurality of policies corresponding to the third-party content in a local cache on the client device;

receiving a request for data from the child user over the internet network;

correlating by the local application on the client device, the third-party content with the plurality of policies stored in the local cache;

identifying by the local application, a policy associated with the request for the data based on correlation; and authorizing by the local application, the request for the data based on the identified policy.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
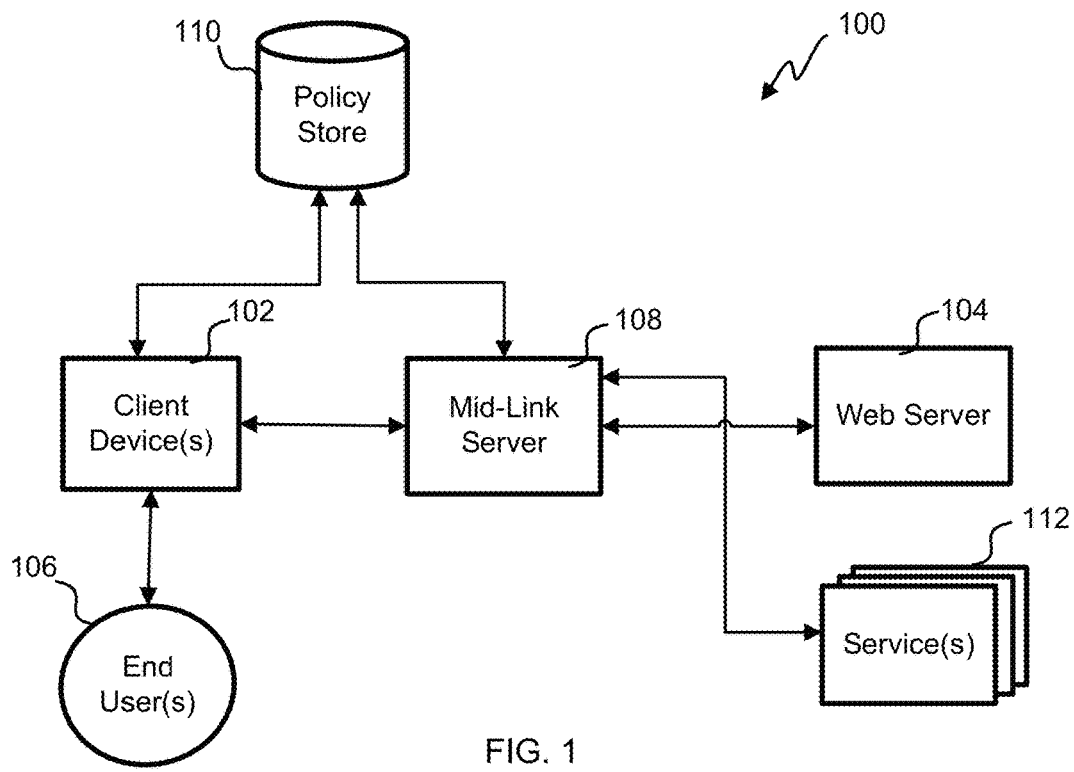
FIG. 1 illustrates a block diagram of an embodiment of a policy-controlled access system.

Referring first to FIG. 1, a block diagram of a policy-controlled access system 100 is shown. The policy-controlled access system 100 includes client device(s) 102, a web server 104, end-user(s) 106, a mid-link server 108, a policy store 110, and service(s) 112. The client device(s) 102 such as smartphones, tablets, PCs, and any other computing devices communicate with the web server 104 via encryption links using the internet. The client device(s) 102 may be secured by using the mid-link server 108 that remotely hosts a secured software environment. The client device(s) 102 run any popular operating system (OS) such as Windows™, iOS™, Android™, Linux, set-top box OSes such as Real-Time Operating System (RTOS), Unix OS, Linux-Kernel, and Linux OS in the Internet of Things (IoT)/Industrial control systems (ICS)/Distributed Control Systems (DCS)/Operational Technology (OT), and Chromebook™. The operating system of the client device(s) 102 runs third-party apps. The policy store 110 (or a policy component) holds policies for individual client device 102 and the mid-link server 108.

The client device(s) 102 use content and processing from the web server 104 including content sites, for example, web sites, plugins, streaming content, etc., and the service(s) 112 for example, SaaS tools, databases, cloud service providers, etc. Under policy control, the client device 102 routes some interaction to the mid-link server 108 that hosts a controlled software environment for each end-user 106 to securely interact with the web server 104 and the service(s) 112 or enterprise tools in a way limited by specified policies. For example, policies may specify third-party content that may be permitted to be accessed on the client device 102 while using the controlled software environment by remote access. The third-party content includes websites, web applications, streaming, browsing, web activities, activities performed on the mobile application or in-app activities, online transactions, and other activities via third-party providers. The policies for the third-party content specify a manner in which the third-party content is to be accessed by the end-user(s) 106.

The policies control how the third-party content will be accessed on the browser or applications and provide functionalities. For example, some websites may be blocked, some may be permitted, and some may be permitted for a specific time of the day. Some applications that provide the service(s) 112 are accessed at the client device 102. These applications may also access the websites based on the policies. Other policies may enable specific software applications, browser extensions, or interaction on the client device 102 while physically on-premises, in a home internet security system, and permitting different software applications, browser extensions, websites, mobile applications, or interaction while working in the field or at home away from the enterprise premises. In one example, a policy associated with a website on the client device 102, may either enable/disable access to features and functionalities of the website on a remote software environment when accessed from a mobile of the end-user 106. In some cases, enforcement of the policy depends on whether the client device 102 is within the home, enterprise, or away from the office. For example, the end-user 106 may be permitted to access a website or stream content using the home Virtual Private Network (VPN) during the daytime while the access to the website may be blocked when the end-user 106 is away from the home or during the night. In another embodiment, the policy may specify access to the website during work hours and disable access after work hours. An example of the policies is illustrated in Table 1 discussed below.

Table 1 below illustrates a list of policies, a list of third-party content, authorization, and an aggregate risk associated with the third-party content stored in the policy store 110.

TABLE 1

| Policies | Third-party content | Authorization | Aggregate Risk |
| --- | --- | --- | --- |
| Policy 1 | Gaming | Permit during a specific time of day | 3 |
| Policy 2 | Entertainment | Permit during 2 hours in a day | 1 |
| Policy 3 | Social Media | Permit during 4 hours at night | 1.6 |
| Policy 4 | Religious | Permit | 4.1 |
| Policy 5 | Adult | Block | 7 |
| Policy 6 | Gambling | Block | 8.2 |

As illustrated in Table 1, the policies are specified with respective third-party content and risk (also termed as aggregate risk). The risk can be associated with a user's browsing activity, user profile set by an administrator, and a category associated with the website like gaming, social media, religion etc. Traffic monitoring can be performed to check traffic flow and determine the risk associated with the traffic flow. The Domain Name System (DNS)/Uniform Resource Locator (URL) associated with the website requested for access may be identified and the risk associated with the DNS/URL may be determined. An aggregate risk takes into consideration the risk associated with the category of the website or application or the third-party content like gaming, social media, or adult and the risk associated with the DNS/URL in the traffic flow. The risk associated with the category of the website specifies a corresponding risk policy. For example, Policy 1 is associated with the gaming website which has the aggregate risk of 3 and permits access to the website during a specific time of the day like afternoon, morning 9 am-11 am, etc. on the client device 102. The aggregate risk is a numerical value on a scale of 0-10 with 0 being the minimum and 10 being the maximum. Similarly, policy 2 is associated with an entertainment website with an aggregate score of 1 and permits access to the website for two hours a day. This policy of time limit is set on the user profile by the administrator who may be a parent of the end-user 106. Policy 3 permits access to social media for hours at night and has an aggregate score of 1.6 and policy 4 permits religious content access and has an aggregate score of 4.1. Policy 5 blocks adult websites with an aggregate score of 7. Policy 6 restricts gambling websites or gambling applications and has an aggregate score of 8.2.

These policies associated with websites are set based on several factors. The factors include the user profile set by the administrator(s) (for example, parents), risks associated with the third-party content determined through the traffic flow from the client device 102 for example, adult content websites, gambling, and the browsing activities of the end-user 106 on the client device 102. The policies are set by an administrator/parent/family member of the end-user 106 based on the factors. Multiple administrators may be there like the father and mother holding separate accounts for the end-user 106. In another embodiment, the policies may be set by the family member like the mother or father of the end-user 106 of the client device 102 either together or independently. The websites that have been permitted access by the administrator are authorized for accessing by the end-user 106 and the third-party content that has restricted access is not authorized for use/blocked by their corresponding policies. The third-party content may be categorized as dangerous, malicious, threat, education, adult, or religious based on their DNS/URL and stored along with their respective policies like permit/deny/limited access in the policy store 110. Based on the DNS/URL of the website requested to access, a match is found in the categorized websites in the policy store 110. Based on the match, the corresponding policy is determined and applied.

The web server 104 includes the content sites such as websites, streaming content, application websites, etc. in order to provide content to the client device(s) 102. The web server 104 also permits the end-user(s) 106 of the client device(s) 102 to upload and download content from the content sites. The web server 104 is in communication with the client device(s) 102 via the mid-link server 108 over the interne connected network. In another embodiment, the policy-controlled access system 100 includes one or more application servers (not shown) for providing dynamic content to the client device(s) 102.

The mid-link server 108 for the work systems resides as a "man-in-the-middle" and intentionally takes over some or all: the processing, application execution, and/or content sites at the web server 104 and the service(s) 112 interaction. The remote software environment is hosted by the mid-link server 108 for a policy-controlled experience using the policy store 110 for authorization. For example, the content sites at the web server 104 may have specific applications disabled, filtered, or modified by the mid-link server 108 so that the client device(s) 102 behaves differently than if it were to directly connect to the content sites of the web server 104. For example, a policy may specify access to a website based on the risk determined by the policy.

Some embodiments have policies that selectively direct the third-party content to the mid-link server 108 based on the network traffic. The network traffic includes the traffic flow including requests for accessing the third-party content, and data transmitted or received from the third-party content. The traffic flow is continuously monitored in real-time or over some time. A category of third-party content such as gambling may fall under the category of dangerous content and hence may be blocked by the content. Another category such as religion may require administrator permission for access. The administrator may also specify the specific time of the day, hours of the day or night, and limitations on the accessing abilities like home VPN, office VPN, WiFi network, or mobile/cellular network. By way of another example, website of gaming may be permitted specifically for a few hours during the day and blocked during the night. Similarly, websites containing adult content may be blocked based on the user profile set by the administrator/parent. Also, websites including social media may be permitted for a few hours in a day by the policy.

The policy store 110 is a database that includes predefined policies for authorizing the third-party content for access to the content or service(s) 112. The policy store 110 also includes the aggregated risks along with the third-party content associated with the policies. The third-party content includes content websites, gaming, social media, entertainment, or education. For example, education-based websites may be permitted by the policy as defined in the user profile by the parent on the home VPN network. Another example is where a policy associated with a war content may be blocked based on the user profile set by the administrator. The policies may be predefined by the administrator on the client device 102. Modified policies are also stored in the policy store 110 by the administrator/parent.

In an embodiment, the policy-controlled access system 100 permits multiple tenants in different domains to communicate with the web server 104 over the internet. The policy-controlled access system 100 permits multiple tenants or enterprises (not shown) to all use the same network separated by domain or some other logical separation. The policy-controlled access system 100 manages browser extensions used to access services in cloud-based multi-tenant system (s) (not shown). Encryption, leased/encrypted tunnels, firewalls, and/or gateways can be used to keep the data from one enterprise separate from other enterprises. Each client device 102 can communicate with the web server 104 for the service(s) 112 and storage using the internet. The mid-link server 108 provides multi-tenancy control, policies and routing for each domain.

Figure 2:
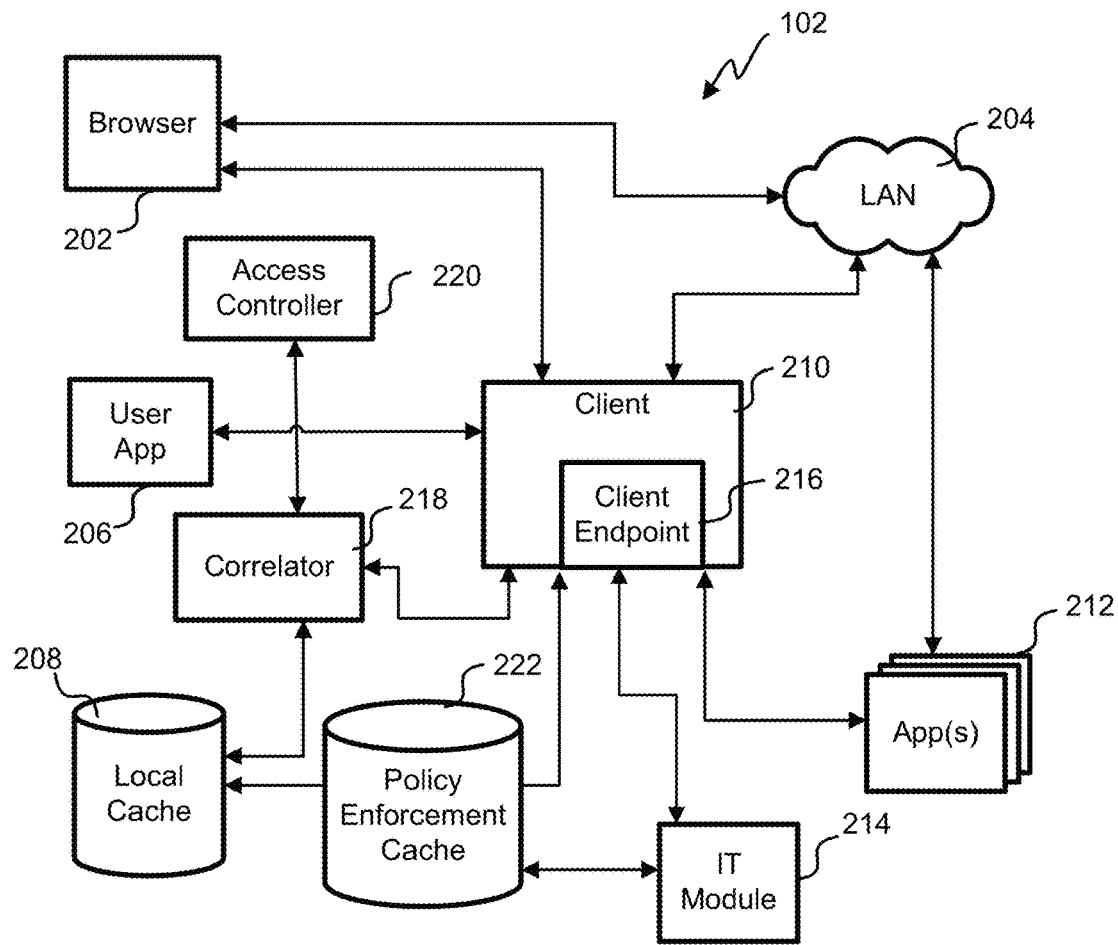
FIG. 2 illustrates a block diagram of a client device that uses a client to establish connections with a mid-link server.

Referring specifically to FIG. 2, a block diagram of the client device 102 is shown. This embodiment of the client device 102 uses a client 210 to establish connections with the mid-link server 108. A user app 206 exclusively uses the client 210 to communicate with the mid-link server 108 to maintain security for the operation of the user app 206.

Display of the remote software environment is performed by the user app 206. In an embodiment, the user app 206 may be a local application. The entire interface of the remote software environment could be displayed, or the interface of a single user app could be displayed. Several instances of the user app 206 could display several user app interfaces respectively. Multiple instances of the user app 206 could have several remote software environments respectively running. For example, a user of Chromebook™ may have one user app 206 running iOS™ and another user app 206 running Linux™ with the ability to switch back and forth in full-screen or windowed mode. The user app 206 is a web browser or a video player in some embodiments merely displaying a stream of video. Policies are defined for the third-party content based on the aggregate risk associated with the third-party content. For example, the content of the websites and the past and current browsing activities of the end-user 106 also influence the aggregate risk associated with the third-party content. Rendering of the website analytics, users browsing history, and user behavior is displayed on the client device 102 for the end-user 106 by the user app 206.

The client 210 can apply policies that are stored locally in a local cache 208 to the client device 102. The local cache 208 is populated with the policies from the policy store 110 that are relevant for the respective client device 102. As conditions change, the policies that are in effect could also change. For example, the use of websites that may access camera/video sensors-based applications on the client device 102 could be disabled inside the office, home, or factory, but re-enabled outside of a geofenced area. Specific features, functions, or applications might be disabled by a specific policy for the websites until specific/particular conditions exist. For example, there may be a policy that restricts websites from accessing adult apps on the mobile of the end-user 106 during the daytime or when using an unrecognized Virtual Private Network (VPN). Further, another policy permits the use of the websites for accessing shopping websites from the client device 102. The client 210 supports the user app 206, apps 212 running on the client device 102 or a browser 202 in communication with the mid-link server 108 via a Local Area Network (LAN) 204.

An Information Technology (IT) module 214 provides an interface for an administrator or parent of the end-user 106 for analyzing log reports and the browsing activities of the end-user 106 and assigning policies to the client device(s) 102. The administrator reviews the policies, the third-party content, the network traffic, and the risk associated with the third-party content. The administrator may also modify the policies by updating and/or upgrading the policies using IT module 214.

A client endpoint 216 tunnels the network traffic between the client device 102 and the mid-link server 108 through a secure tunnel. The communications between the client device 102 and the mid-link server 108 occur using the client endpoint 216. Policies are communicated from the mid-link server 108 to the local cache 208 for storage and retrieval.

A policy enforcement cache 222 receives machine learning generated policies for the administrator from the mid-link server 108 and stores them in the policy enforcement cache 222 for approval by the administrator. On being approved by the administrator, the policies are appended to the policies already stored in the local cache 208, and the cumulated policies are applied to the third-party content.

A correlator 218 matches the DNS/URL of the website with the DNS/URL associated with the browser activities stored in the local cache 208 and identifies the corresponding policy. Based on the policy associated with the DNS/URL of the web site, access is provided to the website by the end-user 106. The local cache 208 performs the steps of policy determination locally and saves the time which would have occurred if the policy determination had taken place at the mid-link server 108.

An access controller 220 is used to either permit or deny access to the website based on the policy. After the policy determination is performed at correlator 218, the access controller 220 performs the authorization of access or denial based on the policy identified by correlator 218. The end-user 106 may either be permitted access or denied access based on the policy.

Figure 3:
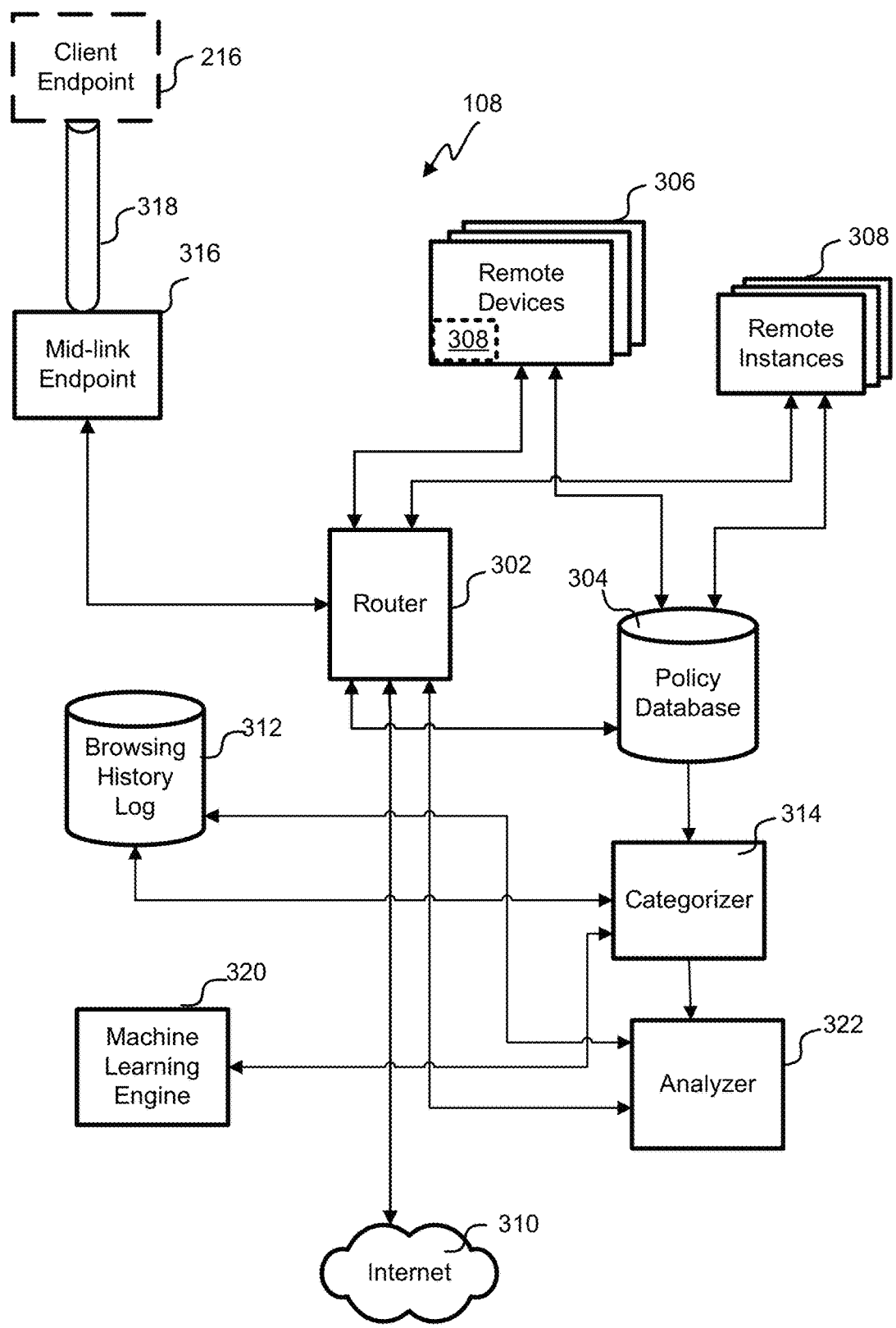
FIG. 3 illustrates a block diagram of a mid-link server that hosts software environments that client device(s) remote into.

Referring next to FIG. 3, a block diagram of the mid-link server 108 is shown that hosts software environments that the client device(s) 102 remote into. Traffic is passed with an Internet 310 accessed through a router 302 to enable the various depicted components of the mid-link server 108 to communicate with each other, specifically, the client 210, a policy database 304, remote devices 306, remote instances 308, a browsing history log 312, a categorizer 314, a mid-link endpoint 316, a secure tunnel 318, a machine learning engine 320, and an analyzer 322.

The mid-link server 108 hosts many different enterprises and domains keeping usage from their different client device(s) 102 separated. In other cases, the mid-link server 108 could be dedicated to a particular enterprise and hosted inside their network or the LAN 204 or with a third-party hosting service. In any event, each remote instance 308 is dedicated to a client device 102 for use, although the IT staff have access to update software, apply policies, make configuration changes, modify admin settings and rights, etc. to maintain the remote instance 308. The client 210 connects with the client device(s) 102 over the Internet 310 in digitally segregated connections like the secure tunnel 318. The client endpoint 216 connects with the mid-link endpoint 316 using the secure tunnel 318. The policies operate in higher levels of the Open Systems Interconnection (OSI) model, such as the application layer to provide enhanced control.

The physical remote devices 306 may be tablets, smartphones, personal computers (Mac or PC), Chromebooks™, Linux™ servers, kiosks, or any personal computing device that employees might use. Any operating system running in a virtual machine on a physical device is supported to enable any enterprise to have their software environments running in secure, controlled, and potentially high-performance instantiations. The remote instances 308 host content sites, websites, or streaming content for the client device(s) 102. The router 302 provides communication between the client 210 and the remote instances 308. The router 302 permits the access or denial of the third-party content based on the communication from the analyzer 322 before the browser extension is installed at the remote instances 308.

The remote devices 306 are physical hardware that hosts the remote instance 308 and is dedicated to the client device 102 currently connected to the mid-link server 108. Not all operating systems enable running in a development mode or as a virtual machine to support all the functionality of the remote instance 308. For those situations, the operating system is running on a physical device temporarily dedicated to the client device 102 with software to enable the end-user 106 to control the remote instance 308.

The policy database 304 includes a list of policies for setting up access between the client device 102 and the remote instances 308 for the third-party content. The list of policies is extracted from the policy store 110. The policy database 304 also includes a list of authorized, third-party content based on the user profile of the end-user 106. The third-party content to be accessed is matched within the list of authorized third-party content along with the list of policies and their corresponding risks for establishing the installation. The policies are set by the administrator who may be a parent of the end-user 106. By way of an example, the website of the education sites, links, or apps may be permitted, and the website of the social media app may not be partially permitted based on the policies. In other embodiments, these policies are further modified based on the new policies or requirements of the administrator. Browsing the history of the websites further influences the modification of the policies. For example, based on a website blocked by the administrator in the past, the policy may require the website to be re-authorized. By way of another example, the applications may be re-authorized by the administrator based on receiving a re-authorization request from the end-user 106, which may be regarding denial of the website by the mid-link server 108. Each website is associated with a traffic risk and a website risk. The aggregate risk takes into consideration the traffic risk and the website risk to generate a composite risk value. The traffic risk indicates a risk associated with the category of the website like religious, adult, or social media, and the website risk indicates a risk associated with a malware, unauthenticated or anonymous website. The aggregate risk determines whether the website is safe to be installed on the client device 102.

The browsing history log 312 includes a database of the user's browser history either authorized or restricted by the administrator or the parent of the end-user 106 of the client device 102. The browsing history log 312 includes a list of the third-party content like websites, and apps visited or tried to visit by the end-user 106. The list of the third-party content is updated regularly in real-time. The browsing history log 312 also includes administrator reports and user reports. The administrator reports include information on blocked websites, re-authorized websites, or unidentified websites obtained from the administrator. Also, information on the websites from the client device 102 and other data sources such as blogs, websites, and social media are incorporated in the user reports. The browser history and usage history of the websites are useful in categorizing and identifying the third-party content. The browser history and the usage history are shared with the IT module 214 for further analysis via the router 302.

The categorizer 314 receives the list of third-party content from the browsing history log 312 and sorts it according to the list of policies from the policy database 304. The third-party content and the corresponding list of policies are categorized and provided to the analyzer 322.

The machine learning engine 320 includes a list of machine learning algorithms that determines risk associated with the third-party content from external sources such as general websites, blogs, articles, Common Vulnerability Scoring System (CVSS), or National Vulnerability Database (NVD). Risk scores for the third-party content are generated by the machine learning engine 320. The risk categorization and the risk scores help the categorizer 314 to organize the third-party content and its policies. The risk categorization further permits the categorizer 314 to request for re-authorization to the administrator or flag an alert to the administrator on the client device 102. In the case of newly found third-party content, the third-party content is authorized by the analyzer 322 and then re-authorized by the administrator in the IT module 214 or the end-user 106 of the client device 102. The new third-party content is categorized and added by the categorizer 314 in the policy database 304 after the authorization.

The third-party content that is newly requested for access and does not have a past usage is categorized as new. The third-party content may also be subcategorized as blocked in case the third-party content was blocked in the past. The categorizer 314 flags an alert to the IT module 214 or the end-user 106 of the client device 102 for re-authorization via the router 302. The categorization is based on machine learning algorithms. The categorizer 314 continuously monitors and updates the categories of the third-party content based on the browsing history logs from the browsing history log 312.

The analyzer 322 performs authorization of the third-party content for permitting or denying access based on the policies from the categorizer 314. The third-party content categorized according to the risks and the policies is used for analysis by the analyzer 322 to either authorize or restrict the third-party content for access. Based on the analysis of the network traffic and the user profile, it is identified in the analyzer 322 whether the third-party content is authorized for installation. The user profile is set by the administrator or parent of the end-user 106 regarding the third-party content or the categories of the third-party content which ought to be permitted access or blocked access. The policies categorize risks associated with the network traffic. Further, machine learning engine 320 provides the risk scores which influence the authorization.

Based on the aggregate risk, the third-party content may be permitted for installation or disabled. The aggregate risk based on the policy associated with the third-party content is stored in the policy database 304. The aggregate risk is compared with a predetermined threshold value to determine whether to access the third-party content or not. If the aggregate risk has a value above the threshold value, then the third-party content is permitted. If the aggregate risk has a value below the threshold value, then the third-party content is blocked.

The analyzer 322 further checks the log of the browsing history from the browsing history log 312 each time the third-party content is accessed or requested. Compliance with the respective policies is checked to track any compromise or misconduct in complying with the policy. There may be malicious or unidentifiable third-party content that creates non-compliance. Unidentified, unauthorized, or malicious links to the third-party content are also flagged to the IT module 214 for re-authorization. For example, analyzer 322 determines the aggregate risk associated with the third-party content, categorizes the third-party content as malicious based on the aggregate risk, and flags to the client device 102 and/or the IT module 214 for inspection and re-authorization. Based on the compliance with the policies and the aggregate risks, the third-party content is scored and ranked.

Figure 4:
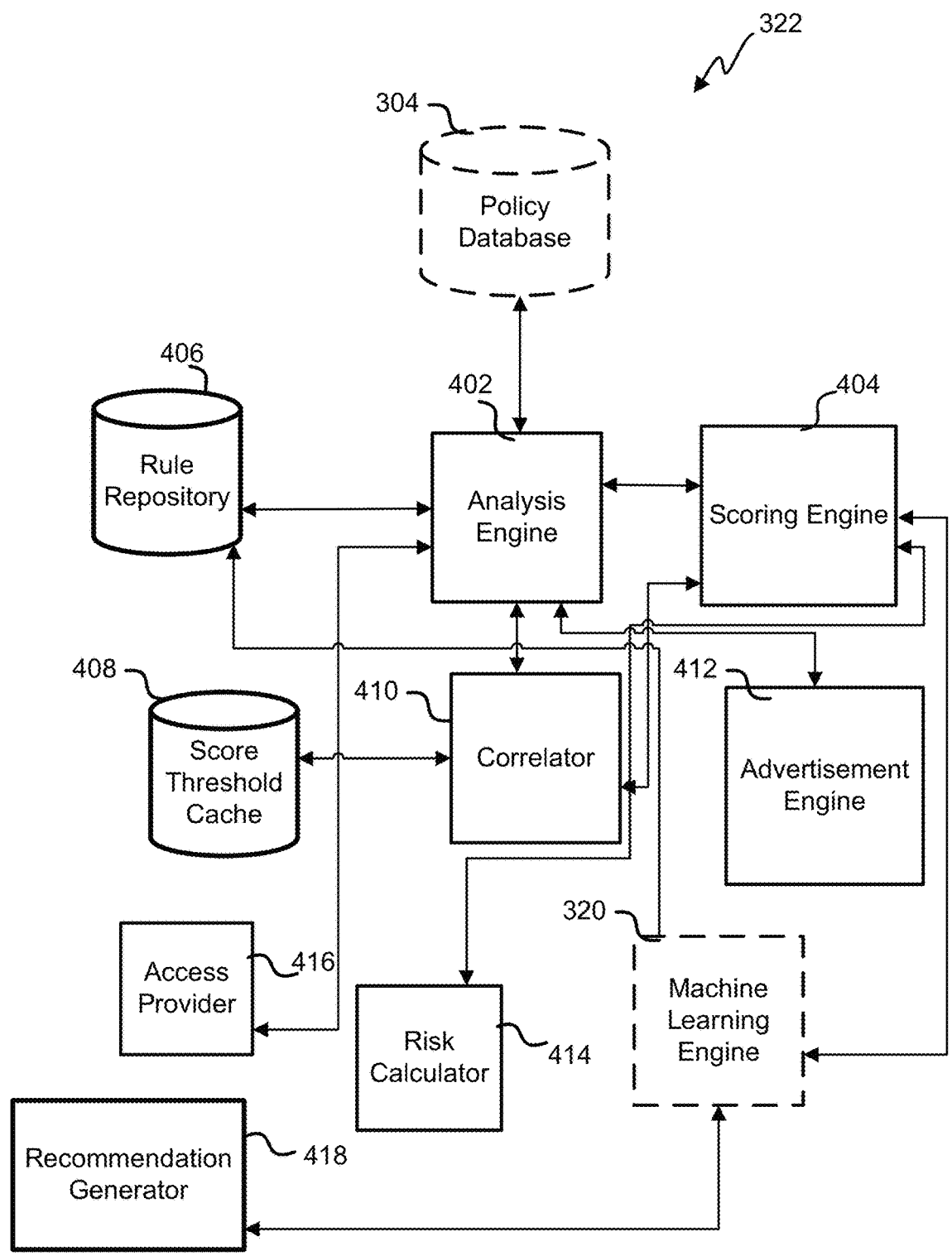
FIG. 4 illustrates a block diagram of an analyzer configured to analyze, correlate, and authorize the third-party content.

Referring next to FIG. 4, a block diagram of the analyzer 322 configured to analyze, correlate and authorize the third-party content is shown. The analyzer 322 includes an analysis engine 402, a scoring engine 404, a rule repository 406, a score threshold cache 408, a correlator 410, an advertisement engine 412, and a risk calculator 414, an access provider 416, and a recommendation generator 418.

The analysis engine 402 performs authorization of the third-party content for access based on the policies stored in the policy database 304 and rules from the rule repository 406. The rule repository 406 receives rules from the machine learning engine 320 generated by using the browsing history log accumulated by the machine learning engine 320. Using the machine learning generated patterns, activity analysis of the end-user 106 is created. The ML algorithms determine rules based on the activity analysis and store the rules in the rule repository 406 for authorization. The rules may be rendered on the client device for viewing by the end-user 106 and/or the administrator. The analysis engine 402 performs the authorization by either permitting or denying the web access. The analysis engine 402 also considers risk scores determined by the scoring engine 404 in the authorization of the third-party content.

The scoring engine 404 calculates the risk scores for the third-party content by considering various factors from the risk calculator 414. The risk calculator 414 determines the factors for risk calculation for the third-party content such as general sources, blogs, articles, Common Vulnerability Scoring System (CVSS), or National Vulnerability Database (NVD), and a category of the third-party content such as adult, education, religious, or social media. The third-party content is categorized based on the usage history and risk information of the third-party content which are received from data sources or Application Programming Interfaces (APIs). The risk information for the risk calculation is collected from publicly and privately available data sources such as social media or weblinks that describe the browser extensions. Machine learning algorithms may be used to extract the risk information. Based on the risk determined by the risk calculator 414, the third-party content may be permitted or blocked. Machine learning algorithms may be used to calculate the risk scores. The risk scores may be a numerical value on a scale of 0-10 with 0 being the lowest and 10 being the maximum.

A machine learning algorithm may be used to assign one or more risk scores to the third-party content. The risk scores may indicate a prerequisite to re-authorize the third-party content and/or disable them temporarily. The risk scores may be numerical values, heat maps, or charts. By way of example, high-risk scores may indicate a higher authorization of the third-party content in terms of security whereas low confidence in third-party content may indicate a lower trust in the third-party content in terms of security. The risk scores may further be used to rank the third-party content in the order of their scores. The risk scores may also be updated based on changes in the policies, categories, and/or usage. The risk scores of each of the third-party content are provided to the IT module 214 and/or the end-user 106 of the client device 102 via the router 302 for further analysis.

The score threshold cache 408 includes predetermined thresholds set for the risk scores. These thresholds may be set by the administrator or set by the local application by default using machine learning algorithms. The correlator 410 compares the risk scores from the scoring engine 404 with the predetermined thresholds. The result of the comparison is provided to the analysis engine 402. Based on the result, if the risk score is less than the predetermined threshold, then access to the third-party content is permitted else if the risk score is more than the predetermined threshold, then access to the third-party content is blocked by the analysis engine 402.

The advertisement engine 412 generates advertisements based on the browsing history of the third-party content of the end-user 106 obtained from the browsing history log 312. The advertisement engine 412 also considers the user profile to suggest advertisements to the end-user 106. The advertisements are provided to the analysis engine 402 which further uses the mid-link endpoint 316 for providing the advertisements to the client device 102. The advertisements are played along with the content of the third-party content and rendered on the client device 102 for the end-user 106.

The access provider 416 finally permits or denies the third-party content access based on the authorization by the analysis engine 402. The access provider 416 is responsible for blocking or permitting or partially permitting access to the third-party content based on the analysis by the analysis engine 402.

The recommendation generator 418 auto-suggests relevant machine learning-generated policy recommendations to the administrator based on the current administrator policy set or explicit interest of the administrator. The recommendation of the policy is rendered on the client device 102 for the administrator. The administrator may modify the policies with the ML-generated policies or append the ML-generated policies with the policies stored in the policy database 304.

Figure 5:
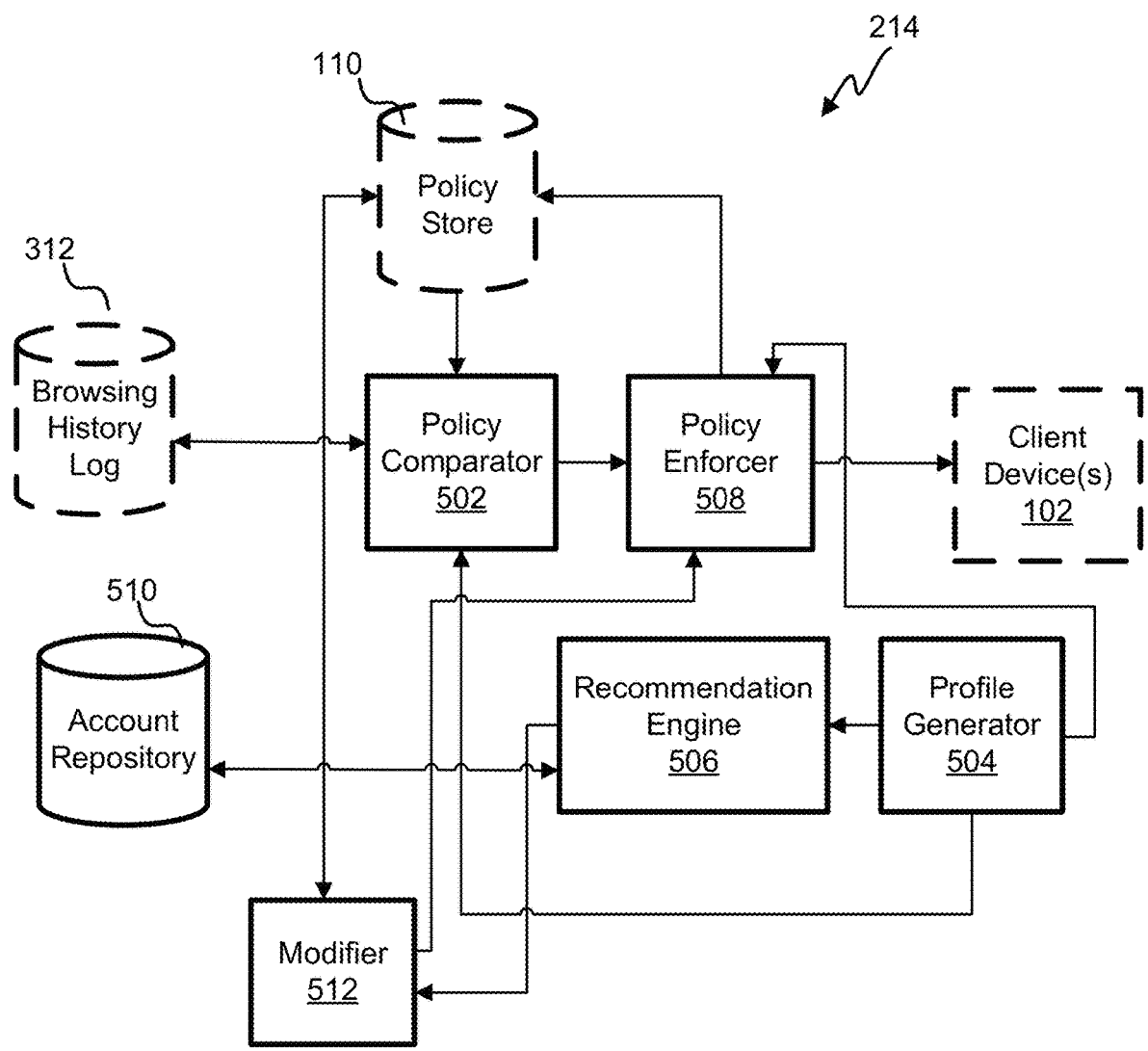
FIG. 5 illustrates a block diagram of an IT module configured to monitor the websites.

Referring next to FIG. 5, a block diagram of the IT module 214 configured to monitor the websites is shown. The IT module 214 includes a policy comparator 502, a profile generator 504, a recommendation engine 506, a policy enforcer 508, an account repository 510, and a modifier 512. The IT module 214 provides an interface for an administrator or the parent of the end-user(s) 106 for analyzing browsing log reports and assigning policies to web access configuration settings on the client device(s) 102. The administrator of the enterprise reviews the policies, the browser history logs, and the applications. The administrator may also modify the policies by updating and/or upgrading the policies using the IT module 214.

The policy comparator 502 receives the browsing history log from the browsing history log 312 which is acquired from user logs of the client device(s) 102. The browsing history log includes the third-party content including websites, applications, and content streaming performed by the end-user 106 on the client device 102 in the past.

The browsing history logs include information on the third-party content from the client device 102 such as enabling or disabling the third-party content or generating an alert for the third-party content. Other data sources such as blogs, websites, databases, and social media on the third-party content are included in the browsing history logs. Machine learning or artificial intelligence algorithms in the recommendation engine 506 may be used to acquire the information of the browsing history to generate machine learning-based policies. The policy comparator 502 further matches each of the third-party content used by the local application of the client device 102 within the list of policies stored in the policy store 110. After matching the third-party content, their respective policies or the modified policies are identified from the list. A comparison output is generated based on the comparison of the third-party content with the respective policy and provided to the policy enforcer 508 for further analysis. Each of the websites, content sites, streaming sites, applications, or web access is mapped in the list of policies.

The profile generator 504 acquires configuration settings from the administrator who may be the parent user and generate the user profile for the child user. The child user uses the client device 102 to access the third-party content based on the configuration settings assigned by the parent user. The configuration setting may be access or denial to particular websites, streaming content, social media, or apps.

There may be multiple administrators like parents including the father and mother of the end-user 106 who may set different configuration settings for the end-user 106.

The recommendation engine 506 includes machine learning algorithms to identify policies and suggest them to the administrator. Automatic policy push back feature of the mid-link server 108 s permits the administrator to view the suggested machine learning policies on the client device 102. The administrator may either modify the existing policies with the machine learning (ML) generated policies or append the newly ML-generated policies to the existing policies. The ML-generated policies may be, for example, a specific duration (hours of day or night) of access to the websites, gaming or religious content, or access to some new useful content sites or apps. The ML-generated policies are based on behavioral analysis of the end-user 106 which is based on the browsing history of the end-user 106, and the configuration settings by the administrator(s). The configuration settings may be set by multiple administrators like the father and mother of the end-user 106, the accounts of the administrators are obtained from the account repository 510.

The policy enforcer 508 applies the policies based on the client device 102 in the form of the configuration settings obtained from the profile generator 504. For example, parental control configuration/settings may be applied by the parent user for the child user or the end-user 106. The policies may include partial block, partial access, complete access, or denial of access to the third-party content. The policies may include the parent configured settings and machine learning-based recommended policies from the recommendation engine 506.

The account repository 510 includes the administrator accounts like the father account and/or mother account. Multiple administrators may set individual configuration settings for the child user/end-user 106. The multiple administrators have their accounts stored in the account repository 510.

The modifier 512 appends or modifies the policies with the ML-generated policies and provides the modified policies to the policy enforcer 508 for applying the policies to the client device 102. The modification of the policies may also be performed by the administrator(s) based on the real time browsing activities of the end-user 106. The modified policies are stored in the policy store 110.

Referring next to FIGS. 6A-6D, a flow diagram of communication between the end-user 106 at the client device 102, and the mid-link server for accessing the third-party content are shown.

Figure 6A:
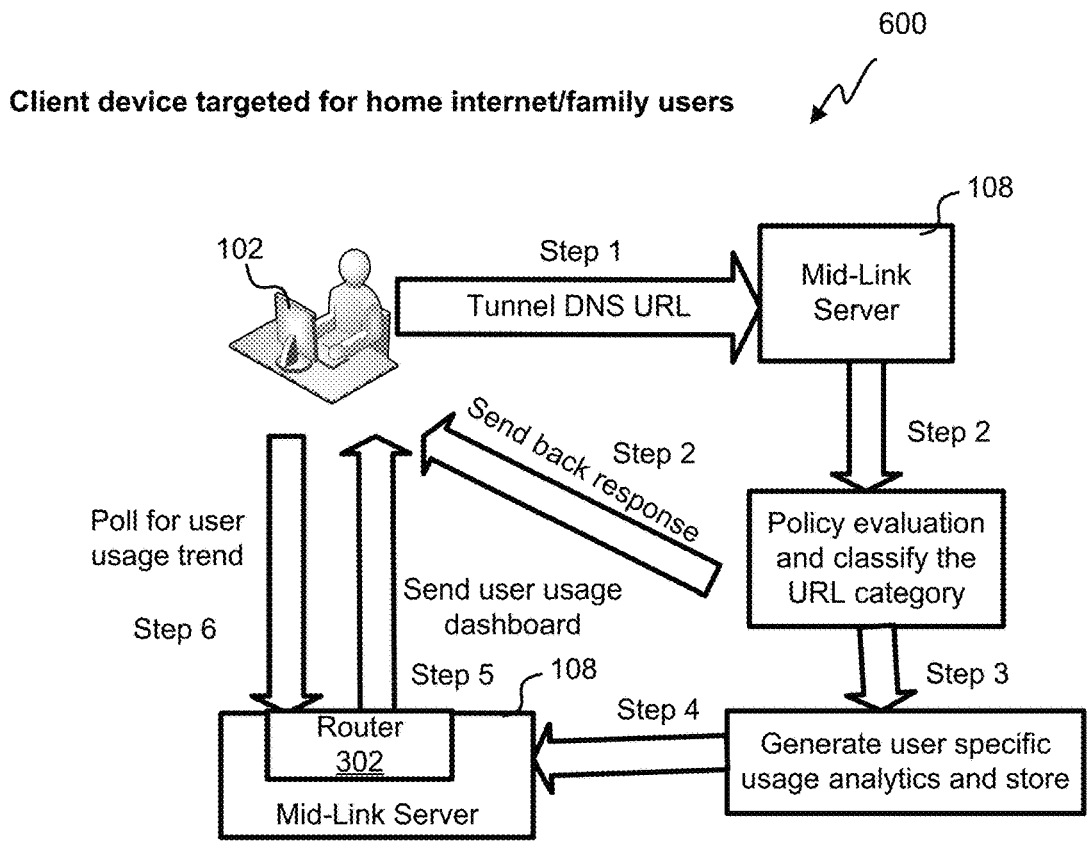
FIGS. 6A-6D illustrates a flow diagram of communication between an end-user at a client device, and a mid-link server for accessing the third-party content.

Initially referring to FIG. 6A, showing a flow diagram 600 of the client device 102 targeted for home internet/family users. The end-user 106 on the client device 102 uses a local application running on the client device 102 to request data over the internet network on the client device 102. The request is sent to a remote application and the mid-link server 108 via the local application. The remote application at the remote instance 308 sends an authorization request to the mid-link server 108 to authorize the request for the data based on a policy associated with the request. The policy is associated with access to the data from the third-party content on the client device 102. At step 1, the end-user 106 uses the client device 102 to send the request for accessing the data. The request is sent to the mid-link server 108. The DNS/URL of the request is tunneled through the secure tunnel to the mid-link server 108. The client endpoint 216 tunnels the DNS/URL to the mid-link endpoint 316. At step 2, a policy is determined corresponding to the request and the DNS/URL in the request is categorized. The policy determined is sent as response back to the client device 102 for display. The policies are enforced by an administrator at the client device 102 referred to as a first mile, the policies are inspected at the mid-link server 108 referred as a middle mile, and the policies are implemented at the web server 104 referred as the last mile. At step 3, user-specific analytics is determined and stored in the policy store 110 for use. At step 4, the generated user-specific analytics is provided to the router 302 to establish the link with the remote instance 308 for the data.

At step 5, the user-specific analytics including usage data of the third-party content is sent to a dashboard on the client device 102. The administrator can view the usage data on the dashboard. Accordingly, the administrator may modify the policy. At step 6, the administrator polls for trends on the usage data to the mid-link server 108 such that the mid-link server 108 provides the trends on the usage data to the client device 102.

Figure 6B:
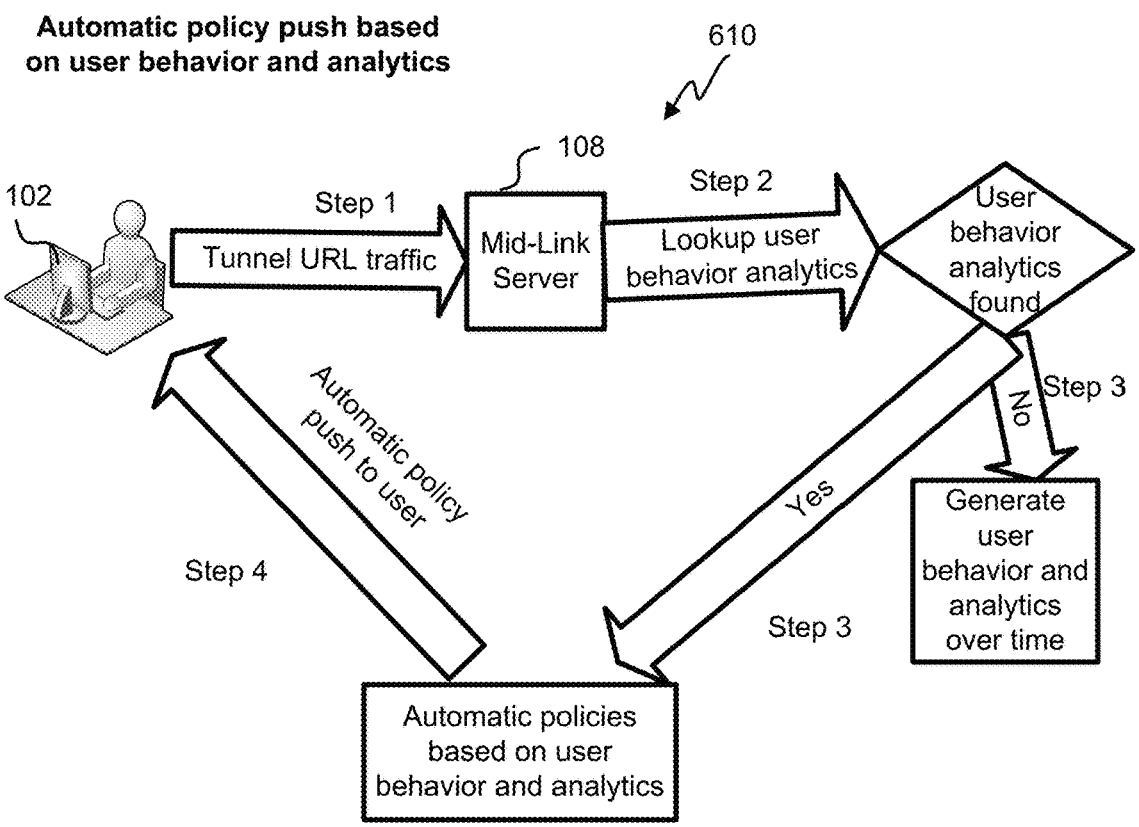

Referring next to FIG. 6B, showing a flow diagram 610 of automatic policy push based on user behavior and user-specific analytics. The end-user 106 on the client device 102 uses the local application running on the client device 102 to access the data on the client device 102. Network traffic of the access of the data is sent to the mid-link server 108. The DNS/URL of the request is tunneled through the secure tunnel to the mid-link server 108. The client endpoint 216 tunnels the DNS/URL to the mid-link endpoint 316. At step 2, the mid-link server 108 looks up for user behavior and analytics in the policy store 110. At step 3, if the user behavior and analytics is found then policies are automatically determined based on the user behavior and analytics. If the user behavior and analytics are not found, then the user behavior and analytics is generated over time based on the network traffic. At step 4, the automatic policies determined at step 3 are pushed back on the client device 102 for a display to the administrator.

Figure 6C:
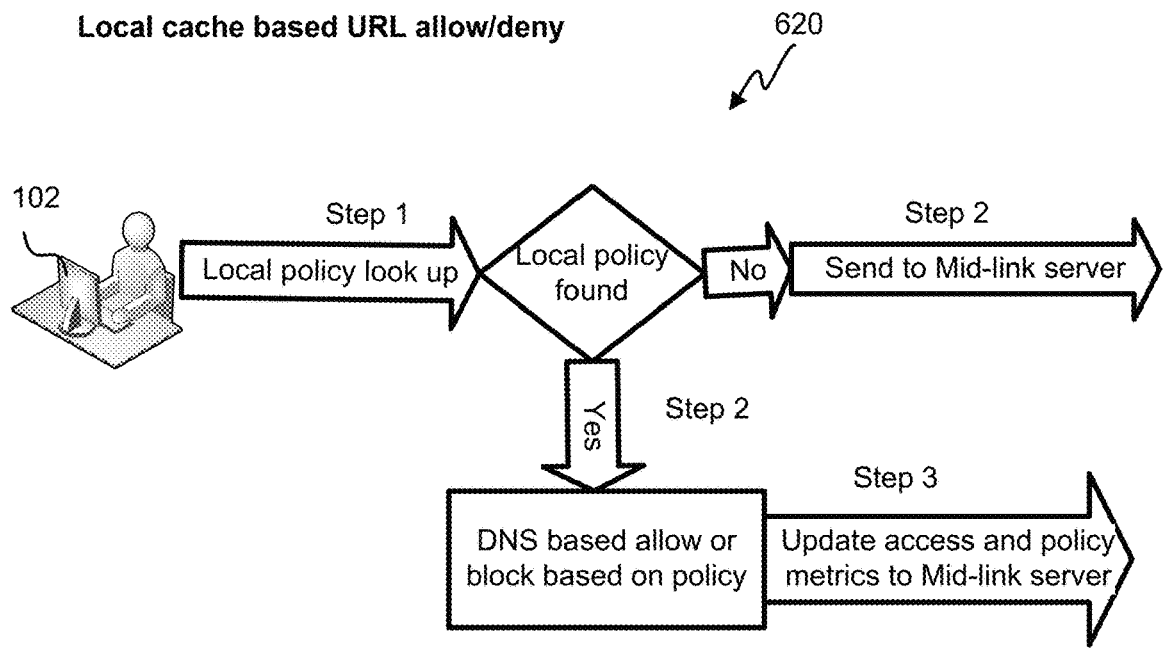

Referring next to FIG. 6C, showing a flow diagram 620 of the local cache 208 based URL permit/deny. At step 1, on receiving a request from the end-user 106 via the client device 102 regarding access to data, a lookup of the policy associated with the data is fetched from the local cache 208 of the client device 102. The local cache 208 stores the policy from the policy store 110. The mid-link server 108 stores the policies from the policy database 304 on the policy store 110 which is further transferred and stored on the local cache 208 of the client device 102 for quick retrieval of data requests. If the policy corresponding to the data request is fetched from the local cache 208 then at step 2, the DNS/URL is extracted from the data request and mapped with the policy. Based on the fetched policy corresponding to the DNS/URL, the data request is either permitted or blocked. At step 3, data access and policy metrics are updated to the mid-link server 108. The policy metrics is the usage history and analytics corresponding to the policy. If the policy is not found in the local cache 208 then at step 2, the data request is provided to the mid-link server 108 for identifying the policy corresponding to the data request.

Figure 6D:
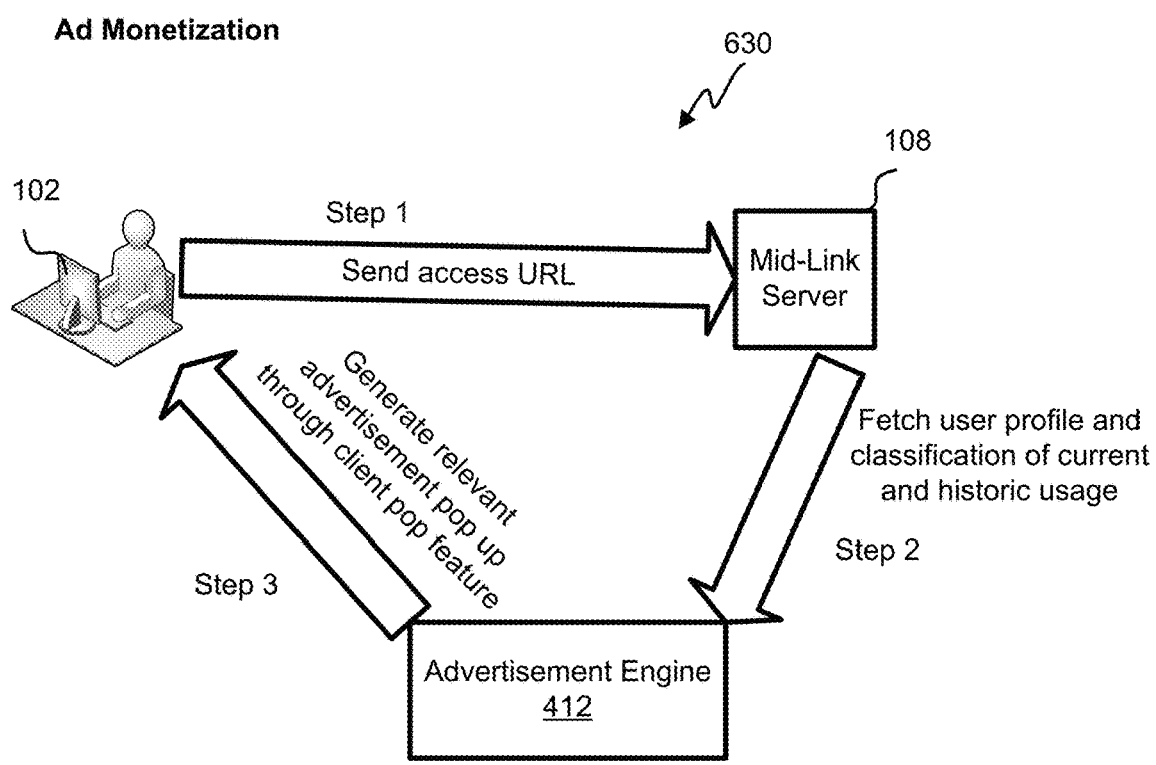

Referring next to FIG. 6D, showing a flow diagram 630 of ad monetization based on user behavior and user-specific analytics. The end-user 106 on the client device 102 uses the local application running on the client device 102 to send the access URL of the third-party content to the mid-link server 108. At step 2, the user profile and classification of current and past usage is fetched from the mid-link server 108 and provided to the advertisement engine 412. At step 3, relevant advertisement pop-up is generated through the client pop feature on the client device 102 for viewing by the end-user 106 and/or the administrator. The end-user 106 may be the child user and the administrator may be the parent user.

Figure 7:
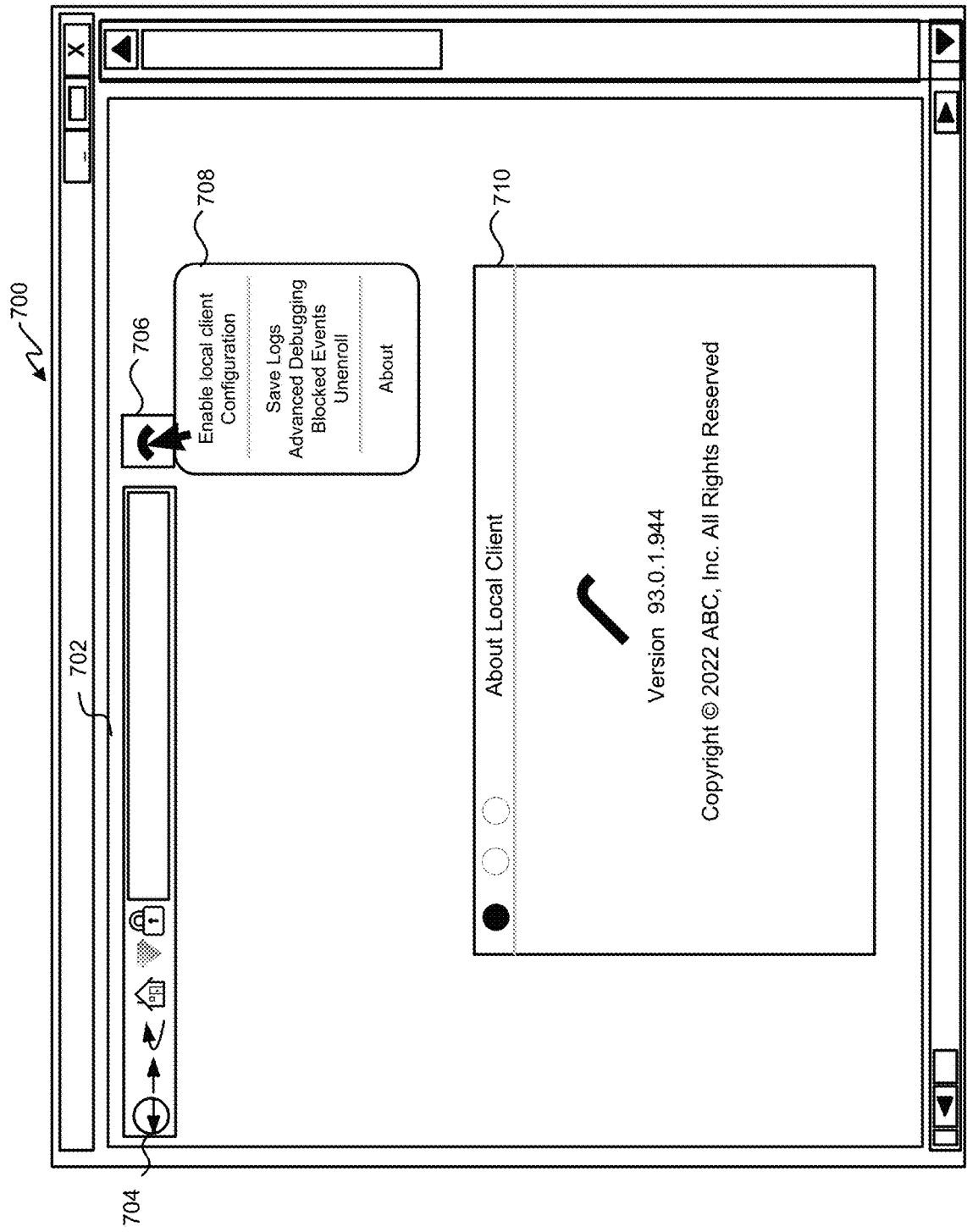
FIG. 7 illustrates a Graphical User Interface (GUI) of a local application running on a client device.

Referring next to FIG. 7, a Graphical User Interface (GUI) 700 of the local application running on the client device 102 is shown. The GUI 700 shows a user section 702 displaying elements of the GUI 700. The user section 702 includes a taskbar 704 and a start button 706 which activates the local application on clicking. A popup 708 includes fields that enable local client configuration, save logs, advanced debugging, blocked events, unenroll, and about. Clicking on one or more of the fields enables the selection of the particular field. A subsection 710 shows the opening window of the local application with the company name and details.

Figure 8:
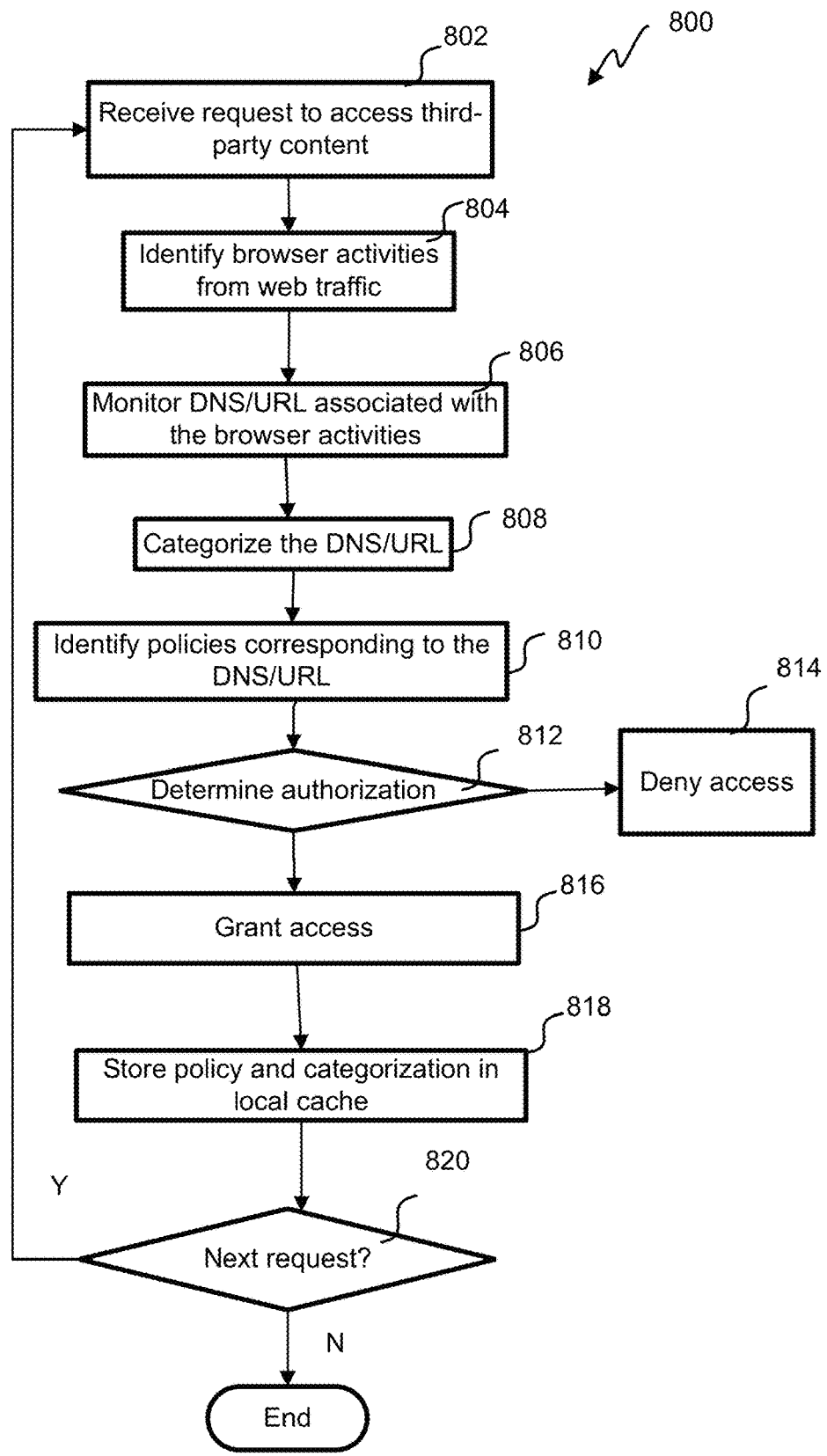
FIG. 8 illustrates a flowchart of an embodiment of a web access authentication process for accessing third-party content on a client device.

Referring next to FIG. 8, a flowchart of an embodiment of a web access authentication process 800 for accessing third-party content on a client device 102 is shown. The depicted portion of the process begins at block 802 where an end-user 106 of the client device 102 requests for accessing third-party content from a remote application at the remote instance 308 of the mid-link server 108. The request is initiated to web server 104 via the mid-link server 108. The end-user 106 is interested to access data from the third-party content. The third-party content may be a website, web or mobile application, streaming content sites, software, applet, downloading, browsing, or installing an application. The mid-link server 108 acts as an intermediate server controlling the access to the third-party content at a middle mile based on a set of policies. The web server 104 provides the data associated with the third-party content to the end-user 106 at the last mile based on the authorization of the third-party content at the mid-link server 108.

At block 804, the network traffic from the client device is monitored to identify traffic patterns. Previous and current browser activities from the client device 102 are identified through the web traffic from the client device 102. The browsing activities are saved in the browsing history log 312 of the mid-link server 108. The browsing activities are provided to the categorizer 314 for further analysis.

At block 806, DNS/URL associated with the websites, links, sites, browsing, installing, and downloading applications is monitored by the categorizer 314. The DNS/URL is a source of the third-party content accessed by the end-user 106. At block 808, the categorizer 314 determines a category of the DNS/URL based on information collected from various sources like websites, NVD, CVSS score, social media, etc. Categorization of the DNS/URL helps to determine the aggregate score of the third-party content of the corresponding DNS/URL. The categorizer 314 prepares a list of the third-party content with their aggregate scores and policies. The categorization of the third-party content can also be like an adult, religious, education, social media, etc. with policies like permitted, partially permitted, or blocked. The categorization and the policies are stored in the policy database 304 of the mid-link server 108. Machine learning algorithms generate an aggregate score for the third-party content based on the policy, compare the aggregate score with a threshold value, and based on the comparison, either the request for the data from the third-party content is permitted or blocked.

At block 810, the analyzer 322, identifies policies corresponding to the third-party content by correlating in the list prepared. The analyzer 322 determines the policies for access to the third-party content. The identified policies are provided to the analyzer 322.

At block 812, the analyzer 322 authorizes the access to the third-party content based on the policies determined from the correlation in the list of the policies. Based on the authorization either, access is provided at block 816 or denied at block 814. In case the access is provided at block 816, the end-user 106 is able to access the third-party content and use the data from the third-party content.

At block 818, the policy and categorization of the third-party content are stored in the local cache 208 at the client device 102 from the policy database 304 of the mid-link server 108. The policy storage at the local cache 208 permits quick retrieval of the policies and saves time taken to retrieve the policies from the mid-link server 108.

At block 820, another request is determined from the end-user 106 of the client device 102 for the third-party content. If a new request is there, then again, the process initiates at block 802 else the process ends.

Figure 9:
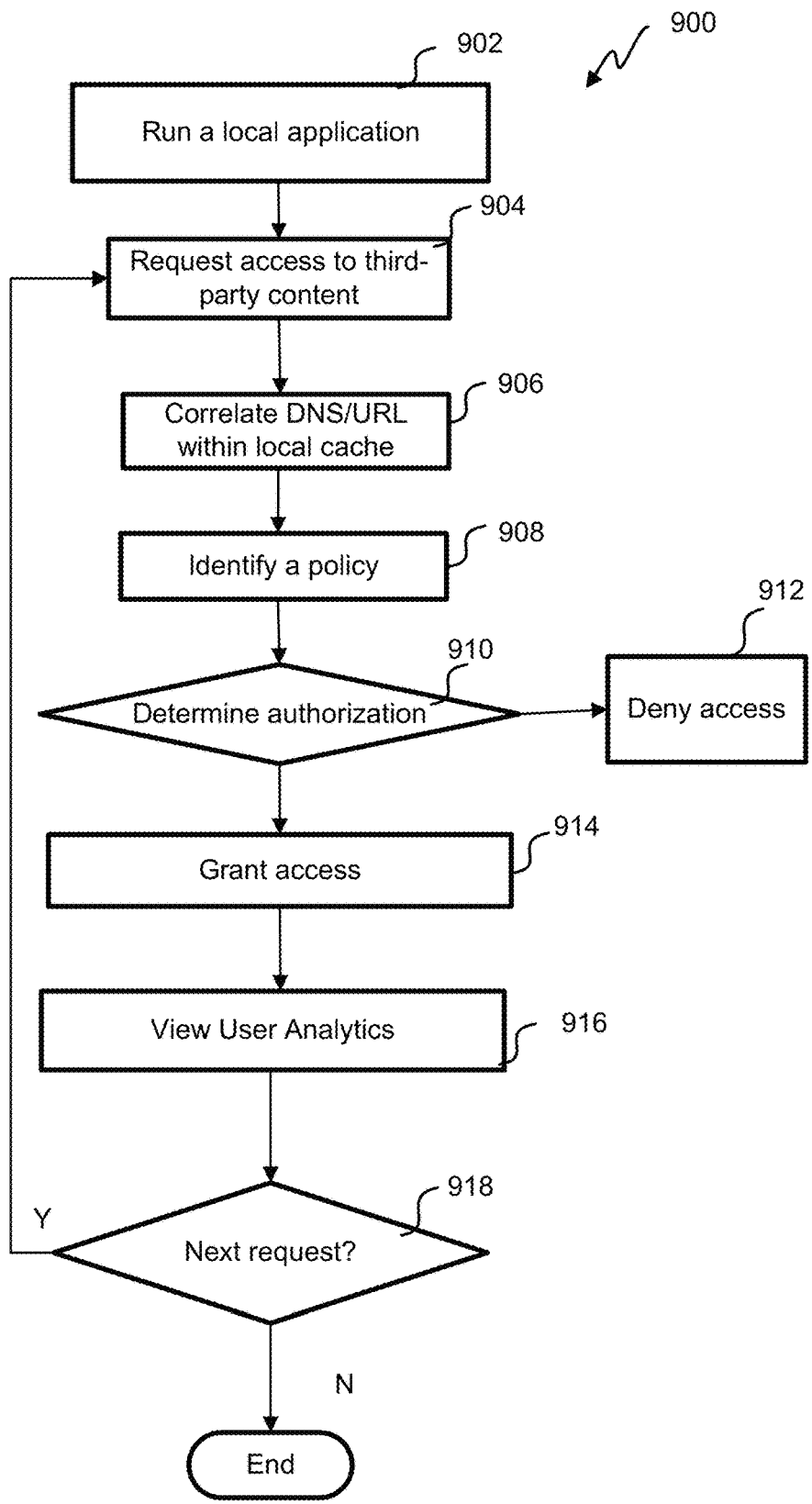
FIG. 9 illustrates a flowchart of an embodiment of a policy determination process at a client device for accessing third-party content.

Referring next to FIG. 9, a flowchart of an embodiment of a policy determination process 900 at the client device 102 for accessing the third-party content is shown. The depicted portion of the process begins at block 902 where the end-user 106 of the client device 102 runs a local application at the client device 102 to access data from the third-party content.

At block 904, the end-user 106 uses the local application on the client device 102 to send the request for the data to the web server 104 via the mid-link server 108. The mid-link server 108 authorizes the request based on the policies to either permit or block access to the third-party content. The mid-link server 108 includes the policy database 304 for storing the policies categorized against their respective third-party content. These policies are also stored in the local cache 208 of the client device 102 for quick retrieval of the policies.

At block 906, the local cache 208 at the client device 102 stores the policies for the authorization of the third-party content. The DNS/URL of the third-party content is correlated with the policies in the local cache 208. The policy may be set by an administrator or parent of the end-user 106. Multiple administrators (for example, mother and father) can specify a different set of policies for the end-user 106 who may be a child. For example, a father may specify access to social media for four hours a day while a mother may specify access to social media for two hours in the evening. The policies may be similar or different at times or may coincide. Machine learning algorithms clarify the coincidences and suggest alternate policies.

At block 908, based on the correlation, a policy is identified based on the correlation by matching the DNS/URL in the request for the data of the third-party content with the DNS/URL stored in the local cache 208. For example, the policy may permit partial access to a gaming site for a period of time (for example, two hours in a day), block adult sites, and permit education sites and apps. Multiple policies may apply to the third-party content based on more than one administrator like the parents of the end-user 106.

At block 910, based on the identified policy, the request is authorized by the analyzer 322. Access to the third-party content may be permitted, partially, or completely. The access to the third-party content may be permitted, or partially permitted, or blocked based on the authorization. For example, the policy may permit religious content for three hours a day and block gambling sites.

At block 912, the third-party content is denied access based on the authorization to block access. If the authorization is to permit access, then at block 914, access to the third-party content is permitted.

At block 916, the analyzer 322 generates behavior analytics of the end-user 106 using machine learning algorithms based on the browsing history, policies applied, data used, and the third-party content. The behavior analytics is displayed to the end-user 106 and/or the administrator(s) on a display such as a display screen of the client device 102 for viewing and analysis.

At block 918, the next request is received from the client device 102 for access to the third-party content. If a new request is received, then the control moves to block 904 else if no request is received the process ends.

Figure 10:
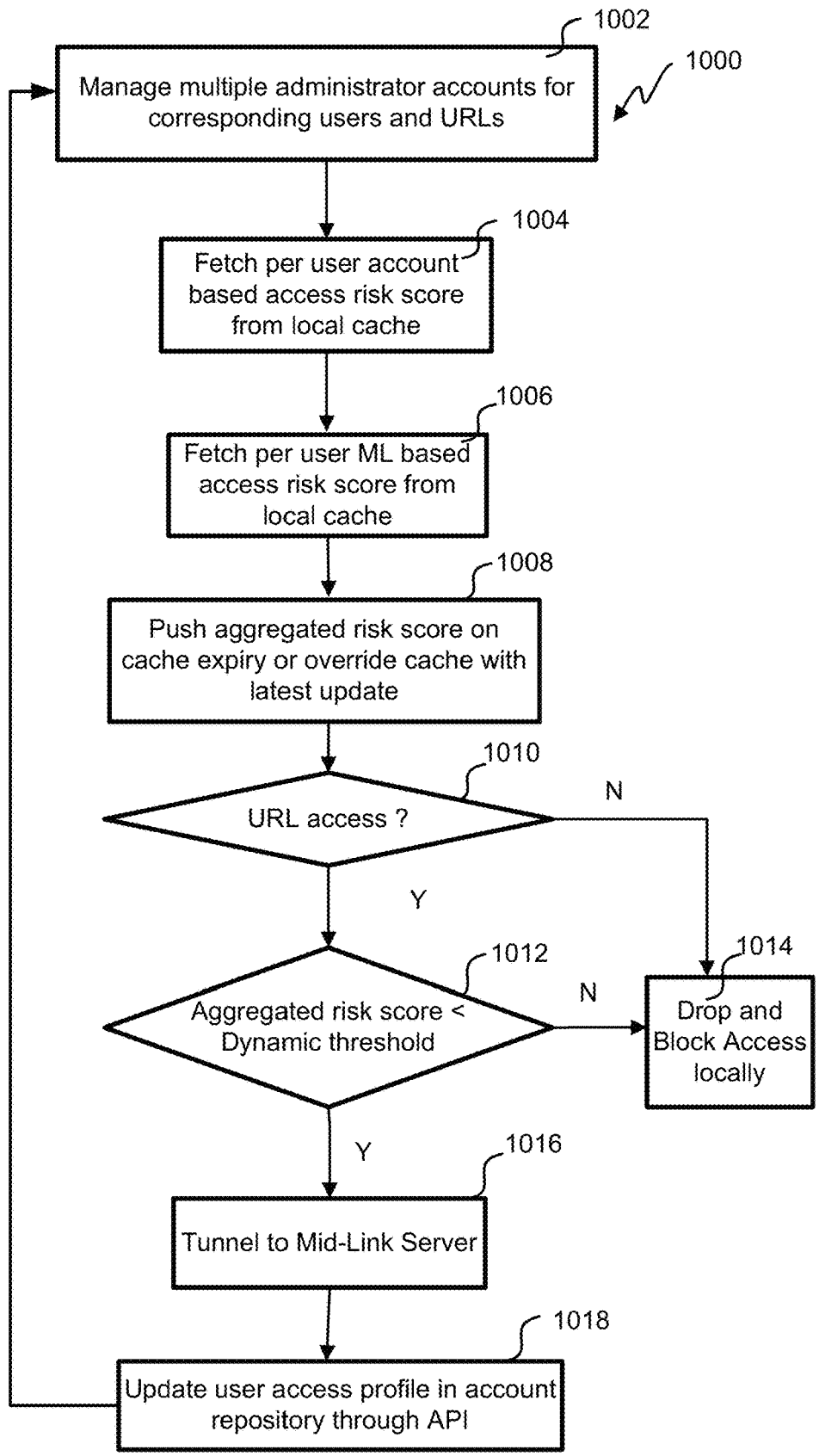
FIG. 10 illustrates a flowchart of an embodiment of a policy management process for policies assigned from multiple accounts for access to third-party content.

Referring next to FIG. 10, a flowchart of an embodiment of a policy management process 1000 for policies assigned from multiple accounts for access to the third-party content is shown. The depicted portion of the process begins at block 1002 where the multiple administrators account for accessing the third-party content by the end-user 106 of the client device 102 are set up by the administrators who can be the parents of the end-user 106. The multiple administrator accounts are managed at the mid-link server 108 and implemented at the client device 102.

At block 1004, administrator accounts of the end-users 106 are identified. Each end-user 106 may have multiple administrator accounts. The policies corresponding to the per-user administrator accounts are fetched from the local cache 208. The policies are stored in the local cache 208 from the policy database 304. Correspondence between the policies from the multiple administrator accounts is checked. For example, a policy set by a mother may restrict social media after 3 pm and a policy set by a father may permit social media from 2 pm to 5 pm. A notification is generated to the mother and father regarding the conflict and the issue may be solved. Machine learning algorithms may also suggest solutions like permit social media from 2 pm to 3 pm and restricting after 3 pm. The per-user account-based access risk scores are fetched from the local cache 208. The account-based risk scores are generated based on policies set by the administrators like block, partial block, and permit, and the feedback from the administrators.

At block 1006, per user, ML-based access risk scores are fetched from the local cache 208. The machine learning algorithms also generate risk scores. Risk scores associated with the third-party content are obtained from data sources like social media, CVSS, NVD, blogs, and other sites and stored in the local cache 208. Further, aggregate risk scores are obtained by cumulating the ML-based risk scores and the account-based risk scores by the scoring engine 404 of the mid-link server 108.

At block 1008, the aggregated risk scores are pushed on the local cache 208 after the expiry of a time period or overridden of the local cache 208 with the recent update of the risk scores. The risk scores change regularly as new risks are generated from third-party content. Based on updated risk scores, policies are also subject to change.

At block 1010, on receiving a request from the end-user 106 for access to the third-party content, a determination on the access to the third-party content is done based on the policies. The determination is made for the URL access corresponding to the third-party content. Based on the policies, if access is to be provided then the control moves at block 1012 else the access is denied at block 1014.

At block 1012, it is determined whether the aggregated risk score is less than a dynamic threshold. If the aggregated risk score is less than the dynamic threshold then the request is tunneled to the mid-link server 108 at block 1016 and access to the data from the third-party content is granted, else if the aggregated risk score is greater than the dynamic threshold the access is denied at block 1014.

At block 1018, based on the aggregate risk score, the user profile in the account repository 510 is updated through an Application Programming Interface (API). The policy database 304 is regularly updated with the policies modified based on the updated risk scores or modified by the administrators from time to time. For example, based on a high risk of religious content, the policy may be updated from partial block to block, and based on a summer vacation of the child user, the social media usage may be permitted all day. The administrator accounts are managed at block 1002.

Figure 11:
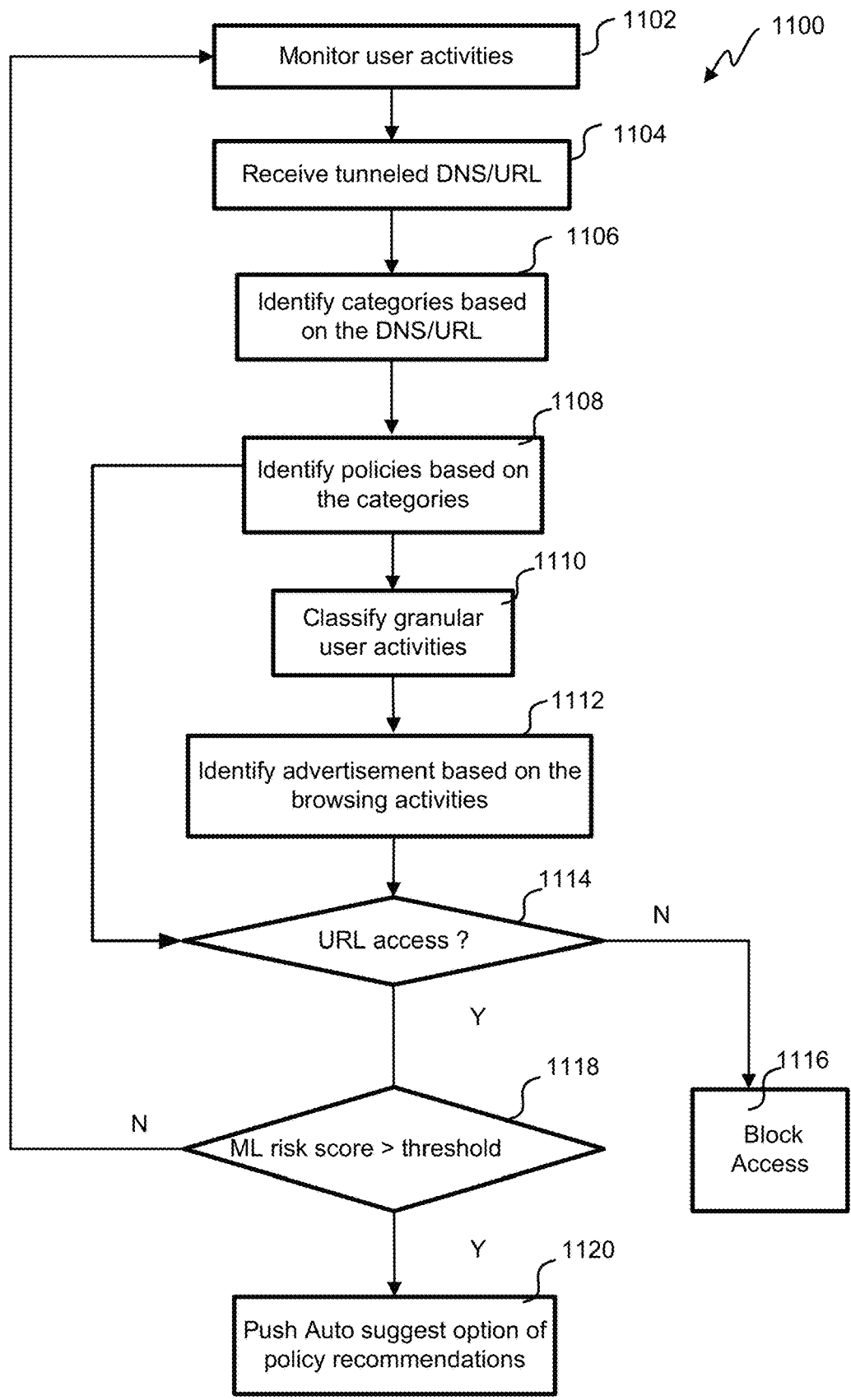
FIG. 11 illustrates a flowchart of an embodiment of an advertisement generation process based on user activities.

Referring next to FIG. 11, a flowchart of an embodiment of an advertisement generation process 1100 based on user activities is shown. The depicted portion of the process begins at block 1102 where user activities of the end-user 106 performed on the client device 102 are monitored and analyzed by the analyzer 322. The browsing history logs 312 stores the user activities and provides the user activities to the analyzer 322. The user activities may include browsing, searching, streaming, downloading, or using applications. The analyzer 322 of the mid-link server 108 keeps track of the user activities and machine learning algorithms analyze the user activities to identify patterns in the user activities, most viewed content, most viewed, or streamed content or browsed content on the client device 102 and check compliance with the policies. Also, the incoming requests for the third-party content are tracked by the end-user 106.

At block 1104, a request for the third-party content is received from the end-user 106. The request is tunneled from the client endpoint 216 at the client device 102 to the mid-link endpoint 316 at the mid-link server 108. The request includes the DNS/URL of the third-party content.

At block 1106, categories of the third-party content are identified based on the DNS/URL. The categories may be adult, religious, education, etc. The categories may be predefined by the administrator or may be suggested by the machine learning algorithms.

At block 1108, policies corresponding to the third-party content are identified based on the categories of the third-party content. For example, adult content may be blocked completely, social media may be partially permitted, and education content may be permitted completely.

At block 1110, the user activities are fetched from the browsing history log 312 and are classified into sub-categories like education sites may include pre-school, nursery, physics, coaching, etc. The classification is performed by the categorizer 314. The sub-categories may include social media including friends, professional or social accounts.

At block 1112, advertisements are identified based on the browsing activities of the end-user 106 using the sub-categories obtained after the classification. The advertisements are generated based on the user behavior analysis of the end-user 106. The user behavior analysis is performed based on the third-party content from the browsing history of the end-user 106. For example, based on users viewing educational content, advertisements related to tuition, study material, and webinars. The user behavior analysis is rendered on the client device 102 for the administrators and the end-user 106.

At block 1114, based on the policies, the URL of the third-party content is determined for access. Either the URL is permitted access at block 1118 or denied access at block 1116 based on the policies.

At block 1118, access is provided to the third-party content. The machine learning-based risk score at the mid-link server 108 is compared with a risk threshold. If the ML-based risk score is less than the risk threshold, the control moves back to monitor the user activities at block 1102. At block 1120, the auto-suggest option of policy recommendations is pushed to the client device 102. The auto-suggest option of policy recommendations is used to display changes in the policy or suggest new policies when the ML-based risk score is greater than the risk threshold. These are ML-generated policies that are generated based on the risk score. For example, completely block a partially permitted policy.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A policy-controlled access system for providing access to third-party content, the policy-controlled access system comprises:
  a client device comprising a local application, the local application runs on the client device; and
  a secure tunnel between a client endpoint of the client device and a mid-link endpoint of a mid-link server, the secure tunnel is configured to:
    provide, network traffic from the client device to the mid-link server, wherein the network traffic includes the third-party content accessed by a child user on the client device;
  wherein the mid-link server is configured to:
    monitor the network traffic from the client device;
    identify a plurality of policies corresponding to the third-party content on the client device, wherein the plurality of policies is based on parental control configuration set by a parent user on the client device;
    store the plurality of policies corresponding to the third-party content in a local cache on the client device;
    receive a request for data from the child user via the client device;
  wherein the local application on the client device is configured to:
    correlate the third-party content with the plurality of policies stored in the local cache;
    identify a policy associated with the request for the data based on correlation; and
    authorize the request for the data based on the identified policy.

2. The policy-controlled access system for providing access to third-party content of claim 1, wherein the mid-link server is further configured to:
  use machine learning algorithms to generate user behavior analysis based on the third-party content on the client device;
  provide to the client device, the user behavior analysis; and
  render on the client device, the user behavior analysis.

3. The policy-controlled access system for providing access to third-party content of claim 1, wherein the plurality of policies is set by one or more parent users.

4. The policy-controlled access system for providing access to third-party content of claim 1, wherein the mid-link server is further configured to:
generate by the mid-link server, advertisements based on the third-party content browsed on the client device; and
render the advertisements on the client device.

5. The policy-controlled access system for providing access to third-party content of claim 1, wherein the mid-link server is further configured to:
generate using machine learning algorithms, rules based on the third-party content; and
provide the rules for rendering on the client device.

6. The policy-controlled access system for providing access to third-party content of claim 1, wherein the mid-link server is further configured to:
generate using machine learning algorithms, an aggregate score for the third-party content based on the policy;
compare the aggregate score with a threshold value; and
based on the comparison, either permitting or blocking the request for the data.

7. The policy-controlled access system for providing access to third-party content of claim 1, wherein the third-party content includes Domain Name System (DNS)/Uniform Resource Locator (URL) of websites browsed or streamed by the child user and/or applications downloaded or installed by the child user.

8. A method for providing policy-controlled web access on an internet connected network, the method comprises:
running a local application on a client device;
provisioning a secure tunnel between a client endpoint of the client device and a mid-link endpoint of a mid-link server;
providing by the secure tunnel, network traffic from the client device to the mid-link server, wherein the network traffic includes third-party content accessed by a child user on the client device;
monitoring by the mid-link server, the network traffic from the client device;
identifying by the mid-link server, a plurality of policies corresponding to the third-party content on the client device, wherein the plurality of policies is based on parental control configuration set by a parent user on the client device;
storing by the mid-link server, the plurality of policies corresponding to the third-party content in a local cache on the client device;
receiving a request for data from the child user over the internet network;
correlating by the local application on the client device, the third-party content with the plurality of policies stored in the local cache;
identifying by the local application, a policy associated with the request for the data based on correlation; and
authorizing by the local application, the request for the data based on the identified policy.

9. The method for providing policy-controlled access on an internet connected network of claim 8, further comprising:
generating by the mid-link server using machine learning algorithms, user behavior analysis based on the third-party content on the client device;
providing by the mid-link server to the client device, the user behavior analysis; and
rendering on the client device, the user behavior analysis.

10. The method for providing policy-controlled access on an internet connected network of claim 8, wherein the plurality of policies is set by one or more parent users.

11. The method for providing policy-controlled access on an internet connected network of claim 8, further comprising:
generating by the mid-link server, advertisements based on the third-party content browsed on the client device; and
rendering the advertisements on the client device.

12. The method for providing policy-controlled access on an internet connected network of claim 8, further comprising:
generating by the mid-link server using machine learning algorithms, rules based on the third-party content; and
providing the rules for rendering on the client device.

13. The method for providing policy-controlled access on an internet connected network of claim 8, further comprising:
generating by the mid-link server using machine learning algorithms, an aggregate score for the third-party content based on the policy;
comparing the aggregate score with a threshold value; and
based on the comparison, either permitting or blocking the request for the data.

14. The method for providing policy-controlled access on an internet connected network of claim 8, wherein the third-party content includes Domain Name System (DNS)/Uniform Resource Locator (URL) of websites browsed or streamed by the child user and/or applications downloaded or installed by the child user.

15. A policy-controlled access system for providing access to third-party content based on policies in the internet network, the policy-controlled access system comprises a plurality of servers, collectively having code for:
running a local application on a client device;
provisioning a secure tunnel between a client endpoint of the client device and a mid-link endpoint of a mid-link server;
providing by the secure tunnel, network traffic from the client device to the mid-link server, wherein the network traffic includes third-party content accessed by a child user on the client device;
monitoring by the mid-link server, the network traffic from the client device;
identifying by the mid-link server, a plurality of policies corresponding to the third-party content on the client device, wherein the plurality of policies is based on parental control configuration set by a parent user on the client device;
storing by the mid-link server, the plurality of policies corresponding to the third-party content in a local cache on the client device;
receiving a request for data from the child user over the internet network;
correlating by the local application on the client device, the third-party content with the plurality of policies stored in the local cache;
identifying by the local application, a policy associated with the request for the data based on correlation; and
authorizing by the local application, the request for the data based on the identified policy.

16. The policy-controlled access system for providing access to third-party content based on policies in the internet network of claim 15, further comprising:

generating by the mid-link server, using machine learning algorithms, user behavior analysis based on the third-party content on the client device;

providing by the mid-link server to the client device, the user behavior analysis; and rendering on the client device, the user behavior analysis.

17. The policy-controlled access system for providing access to third-party content based on policies in the internet network of claim 15, wherein the plurality of policies is set by one or more parent users.

18. The policy-controlled access system for providing access to third-party content based on policies in the internet network of claim 15, further comprising:

generating by the mid-link server, advertisements based on the third-party content browsed on the client device; and rendering the advertisements on the client device.

19. The policy-controlled access system for providing access to third-party content based on policies in the internet network of claim 15, further comprising:

generating by the mid-link server using machine learning algorithms, rules based on the third-party content; and providing the rules for rendering on the client device.

20. The policy-controlled access system for providing access to third-party content based on policies in the internet network of claim 15, wherein the third-party content includes Domain Name System (DNS)/Uniform Resource Locator (URL) of websites browsed or streamed by the child user and/or applications downloaded or installed by the child user.

* * * * *